United States Patent
Oliver et al.

(12) 
(10) Patent No.: US 6,393,517 B1
(45) Date of Patent: May 21, 2002

(54) SCSI PORT FILTER DRIVER FOR ENHANCED AUDIO DATA

(75) Inventors: Richard J. Oliver, Laguna Beach; Jeff Claar, Tustin Ranch; Roger Duvall, Garden Grove, all of CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/387,579

(22) Filed: Aug. 31, 1999

(51) Int. Cl.$^7$ .......................... G06F 12/02; G06F 13/12
(52) U.S. Cl. ...................... 711/112; 711/103; 711/173; 710/62
(58) Field of Search .................. 711/111, 112, 173, 711/103, 113, 114; 710/62; 707/206; 382/233; 369/58

(56) References Cited

U.S. PATENT DOCUMENTS

| | | | | |
|---|---|---|---|---|
| 5,600,821 A | * | 2/1997 | Falik et al. ................. | 711/173 |
| 5,659,801 A | * | 8/1997 | Kopsaftis ................... | 710/62 |
| 5,680,482 A | * | 10/1997 | Liu et al. ................... | 382/233 |
| 5,867,466 A | * | 2/1999 | Igarashi et al. ............. | 369/58 |
| 6,070,174 A | * | 5/2000 | Starek et al. ............... | 707/206 |

* cited by examiner

Primary Examiner—Matthew Kim
Assistant Examiner—B. R. Peugh
(74) Attorney, Agent, or Firm—Crosby, Heafey Roach & May

(57) ABSTRACT

A method of recording data, including audio data and control data, to a SCSI drive having both a write mode and a write-verify mode, comprises the steps of initializing the drive to a write mode, receiving recording data and organizing the recording data into SCSI request blocks (SRBs), and checking each SRB to see if it contains a write block. If the SRB includes either no write block or is audio data, then the SRB is recorded by the drive. However, if the SRB includes a write block and no audio data, then the SRB is converted from a write block to a write-verify block and recorded by the drive.

18 Claims, 2 Drawing Sheets

SCSI PORT FILTER DRIVER FOR ENHANCED AUDIO DATA

BACKGROUND OF THE INVENTION

Standard small computer systems interface (SCSI) drives are not fast enough to allow writing of audio data. Such SCSI drives have a write with verify ("write-verify") mode in which all written data is reread and compared with the original data. If there is a recording error, the portion where the error occurs is flagged as bad and the data is recorded at another location on the disk. This is time consuming. For example, when recording eight channels of real time audio data on a "Jaz" model drive manufactured by Iomega Corporation, the bandwidth suffers significantly due to this write-verify cycle.

However, not all of the recording data needs to be recorded with absolute accuracy. For example, a byte of audio data, which is incorrectly recorded, at worst case, only reproduces as a pop sound. Only certain bits of the recording data, so-called meta data which includes track lists, event lists, and the like, needs to be recorded with absolute accuracy because loss of this data impacts on how large blocks of the audio data are reproduced. If the track data is incorrectly written to the SCSI drive, the entire track is worthless and you will have lost all the data recorded to that track. It would be advantageous to be able to only write-verify this meta data and record the audio data without this routine. Heretofore, however, it has not been clear how to accomplish this objective.

One attempt utilized the fact that the write-verify setting in the SCSI is settable by a bit stored in a memory. Typically, this is an electronic erasable programmed read-only memory (EEPROM). In this scheme, when the control data was to be saved, the bit in the EEPROM was set to write-verify mode. However, the EEPROM was capable of only approximately 100,000 writes before it failed. At a rate of saving track control data every minute or two, this meant that the EEPROM failed in a few weeks. Thus, this scheme has not proven to be practical.

SUMMARY OF THE INVENTION

A method of recording data, including audio data and control data, to a drive having both a write mode and a write-verify mode by organizing the recording data into data blocks, checking each data block to see if it is audio data or control data, recording data blocks determined to be audio data to the drive while the drive has the write-verify mode turned off, and recording data blocks determined to be control data to the drive while the drive is in the write-verify mode. The drive is a SCSI drive and the process is principally executed in software. In the preferred embodiment, the drive is initialized to a write mode and then commanded, when non-audio data is detected, to write recording data while in a write-verify mode.

More specifically, the method of recording data, including audio data and control data, to a SCSI drive having both a write mode and a write-verify mode, according to the present invention, comprises the steps of initializing the drive to a write mode, receiving recording data and organizing the recording data into SCSI request blocks (SRBs), and checking each SRB to see if it contains a write block.

If the SRB includes either no write block or is audio data, then the SRB is recorded by the drive while the write-verify mode is turned off. However, if the SRB includes a write block and no audio data, then the SRB is converted from a write block to a write-verify block and recorded by the drive while it is operating in the write-verify mode. The processing of the SRB to record the SRB on the drive includes sequentially passing the SRB to a SCSI port driver (which interfaces to a SCSI card), a SCSI miniport driver, and a SCSI card.

The present invention further includes an apparatus used in carrying out the above-described method, in particular, a programmed computer.

The foregoing and other objectives, features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENT

Figure 1:
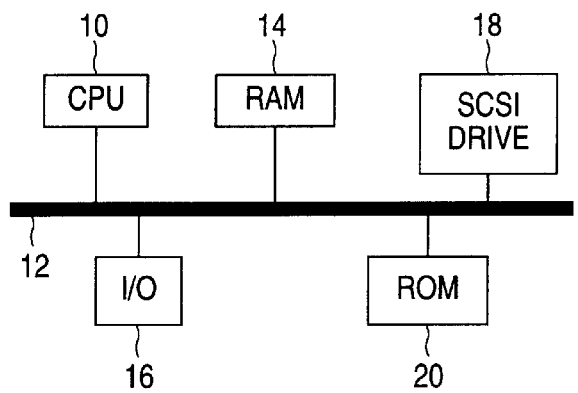
FIG. 1 is a block diagram of an apparatus for carrying out the present invention.

Referring now more particularly to FIG. 1, the present invention is embodied in a system comprising a central processing unit (CPU) 10, connected via a bus 12 to a random access memory (RAM) 14, input/output (I/O) port 16, SCSI drive 18, and read-only memory 20. The CPU 10 is preferably programmed to operate with the Windows NT operating system software. The I/O port 16 receives recording data from a source, not shown. This recording data includes digital audio data and associated control data, i.e. meta data.

Figure 2:
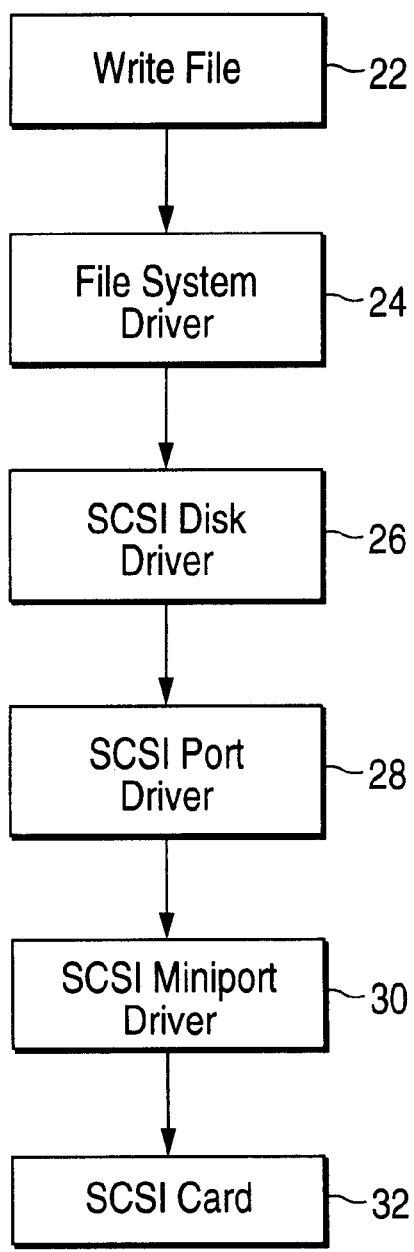
FIG. 2 is an illustration of the software driver hierarchy in a conventional SCSI drive system.

Referring now more particularly to FIG. 2, the CPU 10 of a conventional system is programmed with a hierarchy of software drivers. When the CPU 10, operating under the Windows NT operating system, runs a request to record data to the SCSI drive, it forms a write file 22, which can include such things as a buffer, which supplies information to a file system driver 24. The system driver 24 forms file allocation tables (FAT) which determine where on the disk the data is to be written. The system driver 24 supplies information to a SCSI disk driver 26. The SCSI disk driver takes the information from the file system driver 24 and converts it to SCSI request blocks (SRBs) which are standard SCSI commands which specify the operation to be performed, e.g. a read operation, a write operation, a status request, or the like, and also determine exactly where on the disk of SCSI disk drive 18 the data needs to be written, e.g. the head track, etc.

The SCSI disk driver 26 supplies control and data information to a SCSI port driver 28 which interfaces with an SCSI card 32 internal to the SCSI drive 18. Interposed between the SCSI port driver 28 and the SCSI card 32 is a SCSI miniport driver 30.

As mentioned above, a problem with such a conventional arrangement of drivers is that when recording audio data, the write-verify routine takes such a long time that it significantly cuts into the bandwidth of the apparatus. The present invention overcomes this problem.

Figure 3:
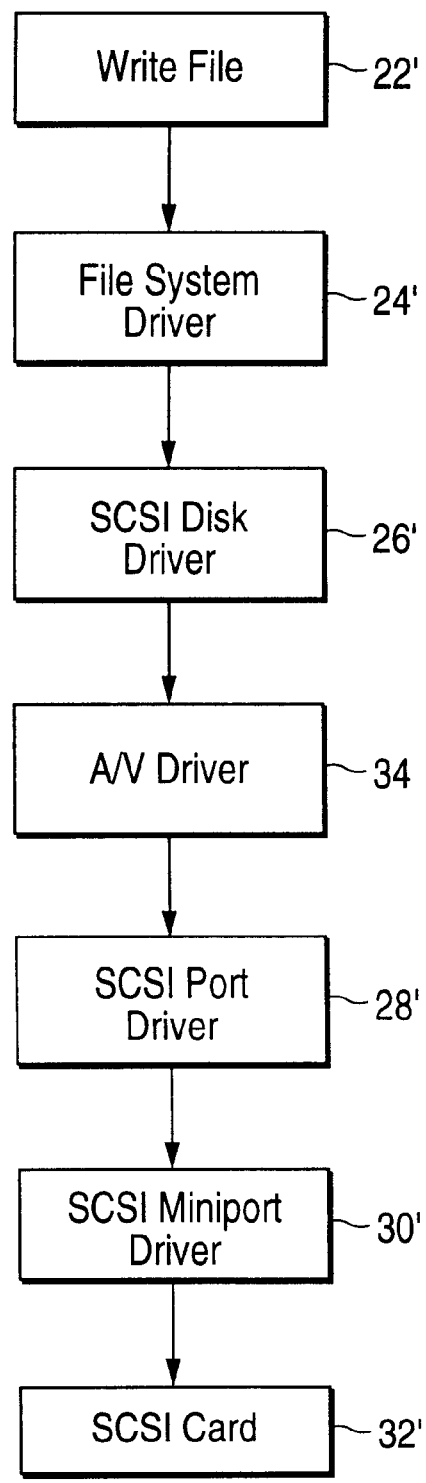
FIG. 3 is an illustration of the software driver hierarchy in the apparatus and method of the present invention.

Referring now more particularly to FIG. 3, the modification of a conventional driver hierarchy according to the present invention is illustrated. The same elements appearing in FIG. 2 have been given the same reference numbers primed (i.e., 22', 24', 26', 28', 30' and 32'). Their functions are generally the same as in FIG. 2 and will not be repeated except as necessary. Inserted between the SCSI disk driver 26 and the SCSI port driver 28 is an audio/visual (A/V) driver 34. It is the function of this A/V driver 34 to initialize the SCSI drive 18, e.g. upon boot up of the system, to turn off the write-verify mode. During recording of data, the A/V driver 34 determines if the SRB received from SCSI disk driver 26 is audio data or command/control data, and if the latter, instructs the SCSI driver 26 to record such data with the write-verify routine.

It accomplishes this by first determining the memory addresses of the data which is received for recording. The digital signal processor (DSP) for the audio data has memory, e.g. 64 megs, associated with it which only stores audio data and not track data. If the data addresses are within the range assigned to the DSP memory, the A/V driver 34 knows that the data is only audio data and if not, that the data is track control data. If the SRB is not audio data, the A/V filter 34 converts the SRB from a write to a write-verify block. The SRBs of all other data are left in the default write (only) mode and recorded. Note that only the SRB is modified to become a SCSI write with verify command. The actual write/write-verify status of the SCSI drive 18, stored in the EEPROM (not shown), is unchanged by this operation. The SCSI drive 18 interprets a SCSI write-verify command as being independent of the write/write-verify status of the SCSI drive 18. This avoids the problem of the EEPROM being written to so many times that it fails.

Figure 4:
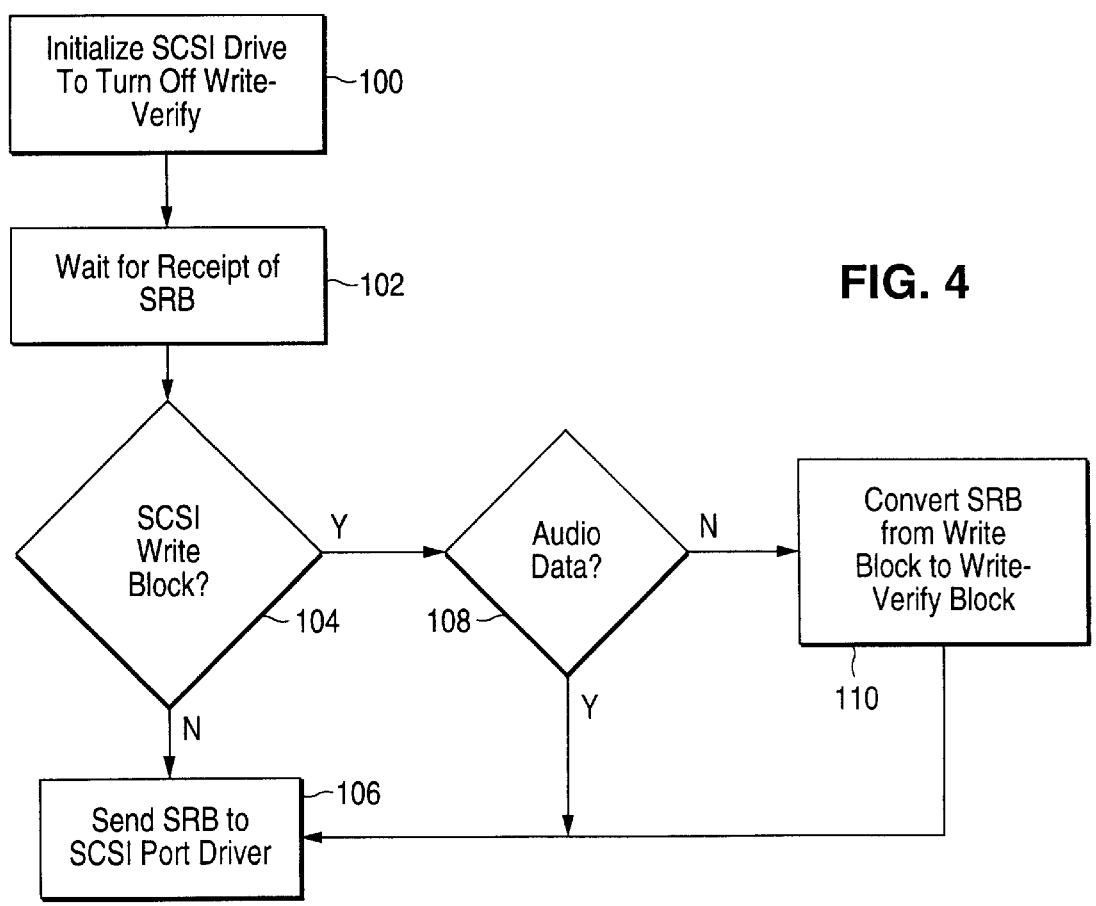
FIG. 4 is a process diagram of the steps followed by the audio/visual (A/V) port filter driver 34 of FIG. 3.

Referring now more particularly to FIG. 4, the operation of the A/V driver 34 is explained in more detail. At an initial step 100, e.g., at boot up of the system, the SCSI drive 18 is initialized to turn off the write-verify mode. Thereafter, the A/V driver 34 waits at step 102 to receive an SRB from the SCSI disk driver 26'. When an SRB is received at step 104, the A/V driver 34 determines if the SRB is a SCSI write block. If not, the recording data is sent to the SCSI port driver 28' at step 106.

If, however, the SRB is a SCSI write block, then at step 108 the A/V driver 34 determines if it is audio data. If so, the A/V driver sends the recording data to the SCSI port driver 28' at step 106. If the determination at step 108 is in the negative, then the A/V driver converts the SRB from a write block to a write-verify block at step 110 and sends the SRB to the SCSI port driver at step 106.

Although the present invention has been shown and described with respect to preferred embodiments, various changes and modifications are deemed to lie within the spirit and scope of the invention as claimed. The corresponding structures, materials, acts, and equivalents of all means or step plus function elements in the claims which follow are intended to include any structure, material, or acts for performing the functions in combination with other claimed elements as specifically claimed.

What is claimed is:

1. A method of recording data, including audio data and control data, to a drive having a write mode, a write-verify mode, and a write/write-verify status stored in a programmable memory, comprising the steps of:
    (a) organizing the recording data into data blocks;
    (b) checking each data block to see if it is audio data or control data;
    (c) recording data blocks determined to be audio data to the drive while the drive has the write-verify mode turned off; and
    (d) recording data blocks determined to be control data to the drive while the drive is in the write-verify mode, wherein the write/write-verify status of the drive is unchanged and is independent of write/write-verify commands of the data blocks.

2. A method of recording data according to claim 1, wherein the drive is a small computer systems interface (SCSI) drive.

3. A method of recording data according to claim 1, wherein steps (b) and (c) are implemented in software.

4. A method of recording data according to claim 1, further comprising the step of initializing the drive to the write mode, wherein the initializing step includes disabling the write-verify mode and leaving the write/write-verify status unchanged, and then, at step (d), commanding the drive to write recording data while the drive is in the write-verify mode.

5. The method of claim 1, wherein the programmable memory of the drive is an electronic erasable programmed read-only memory (EEPROM).

6. A method of recording data, including audio data and control data, to a small computer systems interface (SCSI) drive having a write mode, a write-verify mode, and a write/write-verify status stored in a programmable memory, comprising the steps of:
    (a) initializing the drive to the write mode, wherein the initializing step includes disabling the write-verify mode and leaving the write/write-verify status unchanged;
    (b) receiving recording data and organizing the recording data into SCSI request blocks (SRBs);
    (c) checking each SRB to see if it contains a write block;
        (i) if the SRB includes either no write block or is audio data, then processing the SRB to record the SRB to the drive operating in the write mode; and
        (ii) if the SRB includes a write block and no audio data, then converting the SRB from a write block to a write-verify block and processing the SRB to record the SRB to the drive operating in the write-verify mode, wherein the write/write-verify status of the SCSI drive is unchanged and is independent of a write-verify command of the SRB.

7. The method of recording data according to claim 5, wherein step (c) includes determining whether the addresses of the data making up the SRB fall within a predetermined range known to contain audio data.

8. The method of recording data according to claim 6, wherein processing the SRB to record the SRB to the drive includes sequentially passing the SRB to a SCSI port driver, a SCSI miniport driver, and a SCSI card.

9. The method of claim 6, wherein the programmable memory of the small computer system interface (SCSI) drive is an electronic erasable programmed read-only memory (EEPROM).

10. An apparatus for recording data, including audio data and control data, to a drive having a write mode, a write-verify mode, and a write/write-verify status stored in a programmable memory, comprising:
    (a) means for organizing the recording data into data blocks;
    (b) means for checking each data block to see if it is audio data or control data;
    (c) means for recording data blocks determined to be audio data to the drive while the drive has the write-verify mode turned off; and
    (d) means for recording data blocks determined to be control data to the drive while the drive is in the write-verify mode and while the write verify status of the drive is unchanged, wherein the write/write-verify status is independent of write-verify commands of the data blocks.

11. An apparatus for recording data according to claim 10, wherein the drive is a small computer systems interface (SCSI) drive.

12. An apparatus for recording data according to claim 10, wherein means (b) and means (c) are implemented in software.

13. An apparatus for recording data according to claim 10, further comprising means for initializing the drive to a write mode and the means for recording data blocks determined to be control data includes means for selectively commanding the drive to adopt a write-verify mode and write the recording data determined to be control data while the drive is in the write-verify mode.

14. The method of claim 10, wherein the programmable memory of the drive is an electronic erasable programmed read-only memory (EEPROM).

15. An apparatus for recording data, including audio data and control data, to a small computer systems interface (SCSI) drive having a write mode, a write-verify mode, and a write/write-verify status stored in a programmable memory, comprising:
  (a) means for initializing the drive to the write mode and for disabling the write-verify mode while leaving the write/write-verify status unchanged;
  (b) means for receiving recording data and organizing the recording data into SCSI request blocks (SRBs);
  (c) means for checking each SRB to see if it contains one or both of audio data and a write block;
    (i) means for processing the SRB to record the SRB to the drive operating in the write mode if the SRB includes either one or both of no write block and audio data; and
    (ii) means for converting the SRB from a write block to a write-verify block and then processing the SRB to record the SRB to the drive if the SRB includes a write block and no audio data, wherein the write/write-verify status of the SCSI drive is unchanged and is independent of a write-verify command of the SRB.

16. The apparatus of recording data according to claim 15, wherein the means for checking each SRB determines whether the addresses of the data making up the SRB fall within a predetermined range known to contain audio data.

17. The apparatus of recording data according to claim 15, wherein the means for processing the SRB to record the SRB to the drive includes sequentially passing the SRB to a SCSI port driver, a SCSI miniport driver, and a SCSI card.

18. The method of claim 15, wherein the programmable memory of the small computer system interface (SCSI) drive is an electronic erasable programmed read-only memory (EEPROM).

* * * * *